Patented Feb. 19, 1935

1,991,823

UNITED STATES PATENT OFFICE 1,991,823

RECLAIMING PULP FROM WASTE PAPER

Francis H. Snyder, Niagara Falls, N. Y., assignor to Snyder Maclaren Processes, Inc., New York, N. Y., a corporation of Delaware No Drawing. Application August 11, 1933, Serial No. 684,767

15 Claims. (Cl. 92—9)

This invention relates to the reclaiming of fiber from waste paper, and more particularly to the recovery of pulp from groundwood papers such as old newsprint.

The principal object of this invention is to provide a simple, economical, and commercially practicable process of converting waste paper of the above referred to character into a high grade of pulp.

An important object of this invention is to provide an efficient process of deinking waste paper of the above referred to character and recovering substantially white pulp of first quality.

A further object of the invention is to provide an improved process of deinking old newsprint.

Other objects and advantages of the invention will become apparent during the course of the following description.

I have discovered that printed waste paper, and particularly groundwood papers such as old newsprint, can be rapidly and thoroughly deinked, and a superior quality of white pulp obtained therefrom, by agitating the waste paper in dilute suspension in water to which has been added a soap-forming fatty acid and an alkali metal sulfite, or alkali metal salt of a soap-forming fatty acid and available sulfurous acid radicle, such as an alkali metal bisulfite or sulfurous acid.

In the practice of our process waste paper to be treated is preferably subdivided into relatively small pieces, as by passing the waste paper through a conventional shredding machine. The exact size of the pieces is not material, it merely being advisable to so subdivide the waste paper as to avoid the presence in the mass of thick bulky masses which might damage the beater in which the waste paper is subsequently treated. Following the shredding operation, it is generally advisable to clean the stock as by the use of a conventional dusting machine. Several known processes and forms of apparatus for cleaning waste papers are in use and any one of a number of these may advantageously be employed in the present process.

After the paper has been shredded and dusted, if this has been found to be desirable, it is introduced into a beating engine, preferably an ordinary open paper beater, containing sodium sulfite. The mass is run around the beater several times to effect thorough mixing and thereafter oleic acid is introduced into the beater, preferably by adding it at a point beyond the beater wheel so that it will be thoroughly mixed with the mass by the time it returns to the entry side of the beater wheel.

In preferred practice of my process, a beater is charged with about 20 to 25 tons of water, preferably of zero hardness, and from 50 to 150 pounds of sodium sulfite are added thereto. Thereafter about 1 ton of shredded paper is introduced into the liquid in the beater and from 10 to 20 pounds of oleic acid are added. It is preferred that the treatment be conducted at a temperature of from 80 to 90° F. and this may be accomplished by regulating the temperature of the water introduced into the beater. The mass in the beater is circulated around the beater and subjected to the action of the beater wheel until "shiners" have practically disappeared from the mass. Further beating produces an excess of fine fiber which may be lost to a substantial extent in the subsequent treatment or may introduce complicating factors into the later steps of the process. Ordinarily the beating of the mass for from 15 to 30 minutes is sufficient to completely free the fiber from printer's ink and other extraneous material present, although some types of pulp will be found to require longer beating.

After the completion of the beating action the mass is withdrawn from the beater and the excess liquid is separated from the fiber content and the latter is thoroughly washed with an excess of water. The separation and washing of the fibers may most advantageously be accomplished by passing the mass from the beater directly to a continuous filter and washer, such as the conventional three-cylinder washer commonly used for washing pulp. In this type of apparatus the perforated drum rotates in a tank containing the suspension of fibrous material and by the action of reduced atmospheric pressure or suction the liquid is drawn through the perforations leaving a mat of fiber on the surface of the drum, through which subsequent filtering takes place. During the rotation of the drum the mat of fiber on the surface thereof is subjected to sprays of water, following which the mat is scraped off.

After the separating and washing, the fiber may be conveyed to a storage chest for use in the manufacture of paper or it may be suspended in water and passed over a drum or screen to form laps or sheets of pulp.

While I prefer to produce the deinking composition by adding to the water in the beater an alkali metal sulfite, such as sodium, potassium, or ammonium sulfite, and a soap-forming fatty acid, such as oleic, palmitic, or stearic acid, I have found that the desired results may be obtained by adding to the beater an alkali metal salt of a soap-forming fatty acid and sulfurous acid or an alkali metal bisulfite. In this modification, sodium oleate may advantageously be employed together with sulfurous acid or sodium bisulfite.

The chemicals employed in the process provide a colloidal material which serves to effect complete deinking. While I do not desire to be limited by any theory of operation, the extensive evidence which I have gathered as a result of extensive experiments points strongly to the conclusion that the carbon present in the printer's ink is deflocculated into infinitely small particles by the action of the treating agents and that these materials are taken up or surrounded by the micelles of the colloidal material which is formed, thereby floating the ink particles off from the surface of the fibers.

The pulp produced as a result of the foregoing treatment, even without bleaching, is remarkably white in color and is almost entirely free from particles of carbon as is shown by microscopic examination. Moreover, the pulp is of superior quality as regards fiber strength since the treatment has no deleterious action upon the strength of the fibers present. Moreover, the yield of fibrous material is unusually high and this yield may be somewhat increased by the employment of conventional save-all systems. Finally, the procces is especially adapted for commercial exploitation in view of the short time required for the completion of the process, the low cost of operation, the high yield of fiber, and the avoidance of the necessity for conducting the process at high temperatures or the utilization of steam.

While I have described in detail the preferred practice of my process it is to be understood that the details of procedure may be variously modified without departing from the spirit of the invention or the scope of the subjoined claims.

I claim:

1. The process of reclaiming fiber from waste paper which comprises the step of subjecting a dilute suspension of the waste paper to the action of a deinking composition comprising alkali metal, sulfurous acid, and soap-forming fatty acid radicles.

2. The process of reclaiming fiber from waste paper which comprises the step of subjecting a dilute suspension of the waste paper to a mechanical beating action in the joint presence of a soap-forming fatty acid and an alakli metal sulfite.

3. The process of reclaiming fiber from waste paper which comprises agitating the waste paper in water to which has been added a soap-forming fatty acid and an alkali metal sulfite.

4. The process of reclaiming fiber from waste paper which comprises the step of agitating the waste paper in water to which has been added oleic acid and an alkali metal sulfite.

5. The process of reclaiming fiber from waste paper which comprises the step of agitating the waste paper in water to which has been added a soap-forming fatty acid and sodium sulfite.

6. The process of reclaiming fiber from waste paper which comprises agitating the waste paper in water to which has been added oleic acid and sodium sulfite.

7. The process of reclaiming fiber from waste paper which comprises the step of agitating the waste paper in water to which has been added an alkali metal salt of a soap-forming fatty acid and available sulfurous acid radicle.

8. The process of reclaiming fiber from waste paper which comprises the step of agitating the waste paper in water to which has been added sodium oleate and a compound selected from the group consisting of sulfurous acid and alkali metal bisulfites.

9. The process of reclaiming fiber from waste paper which comprises sub-dividing the waste paper, subjecting the waste paper to a mechanical beating action while in water to which has been added deinking material comprising alkali metal, sulfurous acid, and soap-forming fatty acid radicles, and separating and washing the thus treated fibrous material.

10. The process of reclaiming fiber from waste paper which comprises sub-dividing the waste paper, subjecting the waste paper to a mechanical beating action while in water to which has been added a soap-forming fatty acid and an alkali metal sulfite, and separating and washing the thus treated fibrous material.

11. The process of reclaiming fiber from waste paper which comprises sub-dividing the waste paper, subjecting the waste paper to a mechanical beating action while in water to which has been added oleic acid and an alkali metal sulfite, and separating and washing the thus treated material.

12. The process of reclaiming fiber from waste paper which comprises sub-dividing the waste paper, subjecting the waste paper to a mechanical beating action while in water to which has been added oleic acid and sodium sulfite, and separating and washing the thus treated fibrous material.

13. The process of reclaiming fiber from waste paper which comprises sub-dividing the waste paper, subjecting the waste paper to a mechanical beating action while in water to which has been added sodium oleate and a compound selected from the group consisting of sulfurous acid and alkali metal bisulfites.

14. The process of reclaiming fiber from printed ground wood papers which comprises shredding said papers, adding the shredded material to water, adding a soap-forming fatty acid and an alkali metal sulfite thereto, agitating the resulting mass for about 15 to 30 minutes, separating the fibrous material from the mass, and washing the reclaimed fiber.

15. The process of reclaiming fiber from printed ground wood papers which comprises shredding and cleaning said papers, mixing the material with water and with sodium sulfite and oleic acid, beating the resulting mass at a temperature of about 80–90° F. for from 15 to 30 minutes, separating the fibrous material from the mass and washing the reclaimed fiber.

FRANCIS H. SNYDER.